United States Patent [19]
Audenino et al.

[11] 4,409,756
[45] Oct. 18, 1983

[54] STRUCTURE FOR SUPPORTING AND GUIDING WINDOW PANES OF VEHICLE BODIES

[75] Inventors: Carlo Audenino, Trofarello; Mario Barbero, Turin, both of Italy

[73] Assignee: Fiat Auto S.p.A., Turin, Italy

[21] Appl. No.: 262,879

[22] Filed: May 12, 1981

[51] Int. Cl.³ .............................................. E06B 7/16
[52] U.S. Cl. ...................................... 49/440; 49/490; 49/493; 49/502
[58] Field of Search ................. 49/489, 490, 488, 493, 49/492, 440, 441, 502

[56] References Cited
U.S. PATENT DOCUMENTS

| | | | |
|---|---|---|---|
| 2,994,555 | 8/1961 | McClure | 49/493 X |
| 4,060,272 | 11/1977 | Mori | 49/493 X |
| 4,266,824 | 5/1981 | Inamoto | 49/490 X |

FOREIGN PATENT DOCUMENTS

| | | | |
|---|---|---|---|
| 229925 | 8/1960 | Australia | 49/492 |
| 1077435 | 4/1954 | France | 49/493 |

Primary Examiner—Kenneth Downey
Attorney, Agent, or Firm—Sughrue, Mion, Zinn, Macpeak and Seas

[57] ABSTRACT

A structure for supporting and guiding a motor vehicle window includes a frame which defines the window opening, a channel-shaped member fixed along a side of the frame and a sealing strip housed within the channel-shaped member. The sealing strip has a pair of lips which define a seat for receiving and guiding the edge of the window pane, this seat being displaced from the longitudinal center-line of the channel towards the side wall of the channel-shaped member which is outside the vehicle.

1 Claim, 1 Drawing Figure

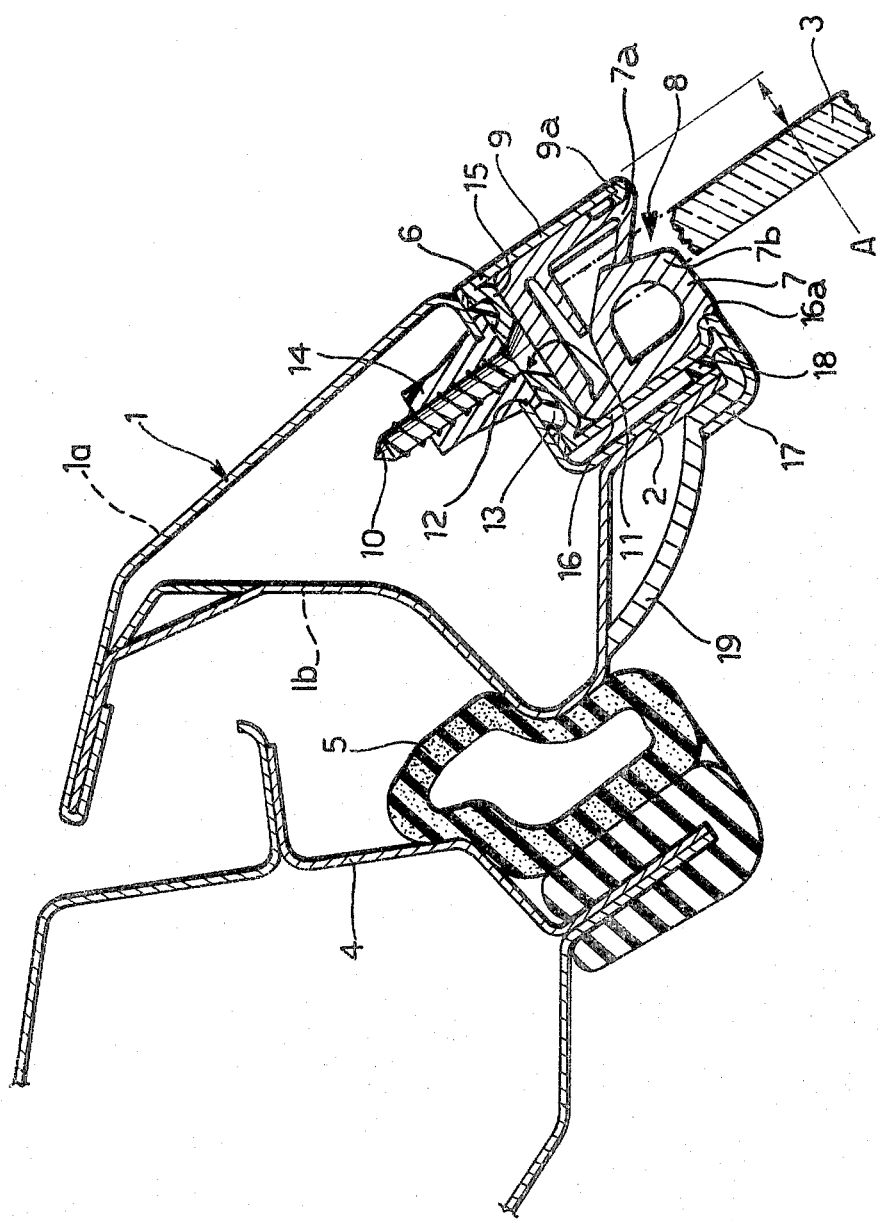

STRUCTURE FOR SUPPORTING AND GUIDING WINDOW PANES OF VEHICLE BODIES

BACKGROUND OF THE INVENTION

The present invention relates to support and guide structures for the side windows of motor vehicle bodies, of the type including a frame which defines the window opening.

Normally the frame is formed by two half-shells which are welded together and constitute one of the doors of the motor vehicle or a portion of the side body panel of the motor vehicle.

The frame includes a lower part which constitutes a side panel of the motor vehicle, a pair of substantially vertical posts which extend from the upper edge of the panel and a horizontal crosspiece which interconnects and joins the upper ends of the posts.

In the case of a window pane which is movable vertically, the two posts, in addition to their support function, act as guides for the movement of the window pane.

In the support and guide structures according to the known art, the edge of the window pane is mounted, possibly slidably, within a sealing strip housed in a perimetral groove in that portion of the frame which defines the window opening and is retained there by resilient clips. Normally the structure further includes a pair of profiled strips, disposed outside and inside the sealing strip respectively with regard to the vehicle, which act as protective and decorative elements.

The technical solution described has considerable constructional complexity and is very expensive due to the number of elements required. Furthermore, in this solution, the outer surface of the window pane is notably displaced towards the interior of the motor vehicle compared with the outer surface of those parts of the bodywork adjacent the vertical edges and the upper edge of the window.

This disposition, as well as being slightly disagreeable from an aesthetic point of view, makes the aerodynamic characteristics of the motor vehicle noticeably worse, increasing the noise at high speeds.

The object of the present invention is to provide a support and guide structure of the type specified above in which the outer surface of the window pane is displaced a relatively small distance towards the interior of the motor vehicle compared with the outer surface of that part of the bodywork adjacent the window, and which is quicker and simpler to assemble.

SUMMARY OF THE INVENTION

In order to achieve this object, the present invention provides a support and guide structure for a side window of a motor vehicle body, including a frame defining a window opening, wherein said structure includes:

a channel-shaped member fixed along a side of said frame and having a base wall and two opposing side walls defining between them a channel facing inwardly of said frame; and a sealing strip housed within said channel and having a pair of lips which define between them a seat for receiving and guiding an edge portion of a window pane, said seat being displaced from the longitudinal centre-line of said channel towards the side wall of the channel-shaped member which is designed to be outside the motor vehicle, in use.

DESCRIPTION OF A PREFERRED EMBODIMENT

The present invention will now be described with reference to the appended drawing, provided purely by way of non-limiting example, which illustrates a section taken in a horizontal plane of one of the frame posts of a support structure according to the invention.

In the drawing, by 1 is indicated one of the frame posts of the support structure according to the invention, which is constituted by two half-shells 1a, 1b welded together. In the embodiment illustrated, the frame has a joining edge portion 2 which projects inwardly of the window opening in a plane substantially parallel to the plane of a window pane 3 which is supported and guided by the structure of the invention.

In the example illustrated, the post 1 forms part of a door of a motor vehicle, which is articulated to the body of the vehicle 4 by means of one or more hinges (not illustrated) and connected to the body 4 by a tubular sealing strip 5.

To the post 1 of the frame is fixed a channel-shaped member 6 which contains a sealing strip 7 having a pair of lips 7a, 7b which define a seat for receiving and guiding the edge of the window pane 3.

The seat 8 is displaced from the centre of the channel-shaped member 6 towards the side wall 9 of the channel-shaped member 6 which is outermost with respect to the vehicle.

Thanks to this characteristic, the distance A between the outer surface of the window pane and the plane defined by the posts and the cross member of the frame of the pane support structure can be reduced considerably, thus improving the aerodynamic characteristics of the vehicle and reducing its noise at high speeds.

Since the sealing strip 7 also acts as a guide for the vertical movement of the pane 3, the lips 7a, 7b are flocked, that is are coated with glued nylon fibres, to reduce their friction with the edge of the pane 3 which is intended to slide in the seat 8.

The channel-shaped member 6 is fixed to the post 1 by means of screws 10 which pass through holes 11,12 in the base of the channel-shaped member 6 and in the post 1 respectively, with the interposition of a strip of expanded material 13 which acts as a gasket.

Plugs 14 of plastics material which are able to retain the screws 10 are inserted in the holes 12 in the post 1.

The base of the channel-shaped member 6 has annular projections 15 around the holes 12 to accommodate the heads of the screws 10.

Each of the side walls 9, 16 of the channel-shaped member 6 has an edge portion 9a, 16a which is turned towards the other wall to prevent the sealing strip 7 from coming out of the channel-shaped member 6.

In the embodiment illustrated, the side wall 16 of the channel-shaped member 6 which faces inwardly of the vehicle has an appendage 17 which is turned over at least part of the edge portion 2 at which the half-shells which form the frame of the structure are joined.

The inner edge of a surround 19 which faces inwardly of the vehicle to act as a protection and embellishment may be interposed between the appendage 17 and the edge 2 with the insertion of a spacing element 18.

Naturally, the effects of the present utility model also extend to models which achieve the same utility by using the same innovative concept.

What is claimed is:

1. A support and guide structure for a side window of a motor vehicle body comprising a frame defining a window opening wherein said frame is formed by two half-shells which are welded together and has an end portion at which the half-shells are joined which projects inwardly of said window opening in a plane substantially parallel to the plane of the window opening, a channel-shaped member fixed along side of said frame and having a base wall and two opposing side walls defining between them a channel facing inwardly of said frame, the side wall of said channel-shaped member which is designed to be inside the motor vehicle in use having an appendage which is turned over at least part of said edge portion at which said half-shells are joined, a sealing strip housed within said channel and having a pair of lips which define between them a seat for receiving and guiding an edge portion of a window pane with said seat being displaced from the longitudinal center-line of said channel towards the side wall of the channel shaped member which is designed to be outside the motor vehicle in use and a surround facing inwardly of the vehicle to act as a protection and embellishment wherein said surround is provided with an internal side portion interposed between said edge portion and said appendage.

* * * * *

UNITED STATES PATENT AND TRADEMARK OFFICE
CERTIFICATE OF CORRECTION

PATENT NO. : 4,409,756

DATED : October 18, 1983

INVENTOR(S) : Carlo Audenino et al.

It is certified that error appears in the above-identified patent and that said Letters Patent is hereby corrected as shown below:

On the title page add:

-- /30/ Foreign Application Priority Data

May 16, 1980   Italy   53206-B/80 --.

Signed and Sealed this

Tenth Day of July 1984

[SEAL]

*Attest:*

GERALD J. MOSSINGHOFF

*Attesting Officer*  *Commissioner of Patents and Trademarks*